United States Patent
Savariar et al.

(10) Patent No.: US 9,353,220 B2
(45) Date of Patent: May 31, 2016

(54) PROCESS FOR MAKING POLYARYLETHERS AND USE IN MEMBRANE PREPARATION

(71) Applicant: Fresenius Medical Care Holdings, Inc., Waltham, MA (US)

(72) Inventors: Selvaraj Savariar, Waltham, MA (US); Kevin Hudson, North Ogden, UT (US); Geoffrey Andrew Russell, Ogden, UT (US); James Leslie White, Ogden, UT (US); Brett Allen Barton, West Haven, UT (US); Cheryl Ford, Ogden, UT (US); Jiunn Teo, Pleasant View, UT (US)

(73) Assignee: Fresenius Medical Care Holdings, Inc., Waltham, MA (US)

( * ) Notice: Subject to any disclaimer, the term of this patent is extended or adjusted under 35 U.S.C. 154(b) by 315 days.

(21) Appl. No.: 13/965,453

(22) Filed: Aug. 13, 2013

(65) Prior Publication Data

US 2015/0048533 A1 Feb. 19, 2015

(51) Int. Cl.

| | | |
|---|---|---|
| *C08G 65/38* | (2006.01) | |
| *D01D 5/06* | (2006.01) | |
| *C08G 8/02* | (2006.01) | |
| *C08G 65/00* | (2006.01) | |
| *C08G 65/40* | (2006.01) | |
| *C08G 75/00* | (2006.01) | |
| *C08G 75/04* | (2016.01) | |
| *C08L 71/00* | (2006.01) | |
| *C08L 81/06* | (2006.01) | |
| *C08G 2/00* | (2006.01) | |

(52) U.S. Cl.
CPC *C08G 65/38* (2013.01); *C08G 8/02* (2013.01); *C08G 65/00* (2013.01); *C08G 65/40* (2013.01); *C08G 75/00* (2013.01); *C08G 75/04* (2013.01); *C08L 71/00* (2013.01); *C08L 81/06* (2013.01); *D01D 5/06* (2013.01); *D10B 2331/301* (2013.01)

(58) Field of Classification Search
CPC .......................... C08G 65/40; C08G 65/4006
USPC ....................................... 528/219
See application file for complete search history.

(56) References Cited

U.S. PATENT DOCUMENTS

| | | | |
|---|---|---|---|
| 3,691,068 A | 9/1972 | Cross | |
| 3,809,682 A | 5/1974 | Studinka et al. | |
| 4,051,300 A | 9/1977 | Klein et al. | |
| 4,105,636 A | 8/1978 | Taylor | |
| 4,108,837 A | 8/1978 | Johnson et al. | |
| 4,400,499 A | 8/1983 | Colon | |
| 4,638,044 A * | 1/1987 | Kelsey | C08G 65/38 528/125 |
| 4,906,375 A | 3/1990 | Heilmann | |
| 5,047,496 A | 9/1991 | Eckel et al. | |
| 5,144,001 A | 9/1992 | Maresca | |
| 5,760,131 A * | 6/1998 | Marrocco, III | C08L 71/123 525/100 |
| 6,437,080 B1 | 8/2002 | McGrail et al. | |
| 6,992,165 B2 | 1/2006 | Hedges | |
| 7,457,037 B2 | 11/2008 | Henry | |
| 8,771,516 B2 * | 7/2014 | Krause | B01D 69/088 210/321.6 |

FOREIGN PATENT DOCUMENTS

| | | |
|---|---|---|
| CN | 101580584 | 11/2009 |
| EP | 0186153 A2 | 7/1986 |
| EP | 0311349 A2 | 4/1989 |
| EP | 0638549 A1 | 2/1995 |
| JP | H01-207320 A | 8/1989 |
| JP | 2006111665 A1 | 4/2006 |

OTHER PUBLICATIONS

International Search Report and Written Opinion issued in corresponding International Patent Application No. PCT/US2014/047340 dated Nov. 11, 2014 (9 pages).

* cited by examiner

*Primary Examiner* — Terressa Boykin (74) *Attorney, Agent, or Firm* — Kilyk & Bowersox, P.L.L.C.

(57) ABSTRACT

A process for making polyarylethers provides a reaction mixture that includes a dipolar aprotic solvent for polyarylether and polyarylether forming reactants, and reacts the polyarylether-forming reactants, with removing of water with nitrogen in the absence of azeotrope forming cosolvent and optionally replacing removed amounts with dipolar aprotic solvent. The process can further include directly wet spinning the reactor solution without recovery of the polymer from the dipolar aprotic solvent through a spinneret to form hollow fibers or flat sheets suitable for membranes.

19 Claims, 3 Drawing Sheets

PROCESS FOR MAKING POLYARYLETHERS AND USE IN MEMBRANE PREPARATION

BACKGROUND OF THE INVENTION

The present invention relates to processes for the preparation of polyarylethers without the use of azeotropic cosolvents. The present invention also relates to the use of polyarylether containing reactor solutions in the preparation of membranes and the products thereof.

Commercially used polyarylethers, such as polysulfone, polyethersulfone, and polyphenylsulfone, have been prepared in dipolar aprotic solvents such as dimethylsulfoxide, N-methylpyrrolidone, sulfolane, and diphenylsulfone. However, the reaction byproduct, water, is a poison to these reactions. An azeotropic co-solvent has been used, such as toluene or chlorobenzene, to remove the water azeotropically during the polymerization. In general, these polyarylethers have to be isolated from the solvents, and are marketed either as pellets or powders. An end-user, such as a membrane manufacturer, redissolves these polymers in an appropriate solvent to make membranes out of solution of the redissolved polymers.

U.S. Pat. No. 4,105,636 relates to aromatic polyethers made by heating an organic sulphoxide or sulphone solvent containing i) a mixture of a bisphenol and an aromatic dihalo compound or ii) a halophenol, in which the halogen atoms in the dihalo compound or halophenol are activated by ortho or para —$SO_2$— or —CO— groups, and an alkali metal carbonate. The water produced by the reaction is removed by distillation in the absence of an azeotrope forming solvent.

U.S. Pat. No. 5,047,496 relates to a process for the preparation of high molecular weight aromatic polyethersulphones from diphenols and dihalogenoaryls, characterized in that N-alkylated acid amides are used as solvents and at the same time for the azeotropic removal of the water from the reaction.

U.S. Pat. No. 6,437,080 B1 relates to a process for the preparation of a polymer composition having at least one aromatic or a mixture thereof with the process involving: i) obtaining a reaction mixture comprising polymer precursors in a first fluid boiling in excess of 100° C.; ii) subjecting the reaction mixture to a first elevated temperature in excess of 100° C. to generate the alkali metal salts of polymer precursors and the polymer reaction products thereof; and iii) subjecting the reaction product mixture to at least a second temperature and isolating the reaction product in the form of a polymer composition which is substantially insoluble in a second fluid, from the first fluid which is substantially soluble in the second fluid, by contacting with an amount of second fluid. U.S. Pat. No. 6,437,080 B1 also relates to a process indicated therein to be conducted in substantial absence of an effective amount of an azeotrope.

Japanese Patent Publication No. 2006-111665 A relates to a method for producing a polyarylene-based polymer by polycondensing an aromatic dihalide compound with a dihydric phenol compound or a dihydric thiophenol compound in the presence of an alkali metal compound in an organic polar solvent. The method is characterized by using a solvent which can be mixed with water, is liquid at ordinary temperature, and has a boiling point of ≥200° C., and then carrying out a polycondensation reaction at the boiling point of the organic polar solvent or at a temperature near to the boiling point in the flow of an inert gas, while removing the by-produced water on the outside of the reaction system together with the organic polar solvent.

Chinese Patent Publication No. 101580584 A relates to a block sulfonated aromatic poly (thio) ether preparation method with the use of sulfonated monomers, non-sulfonated monomer and bis(thio)phenol monomers as starting material in high-boiling aprotic solvent carbonate under alkaline conditions, with the reaction conducted for 10-24 hours, the temperature controlled at 150-200° C., for the preparation of block sulfonated poly aromatic (thio) ether polymers. Chinese Patent Publication No. 101580584 also relates to methods indicated therein to omit toluene as organic solvent and a step for azeotropic water separation.

The present inventors have recognized that it would be desirable to provide a process for making polyarylethers without azeotropic cosolvents in an economically attractive manner, wherein membrane filtration products having suitable physical and performance properties can be manufactured directly from the reactor solution.

SUMMARY OF THE PRESENT INVENTION

A feature of the present invention is to provide a process for making polyarylethers without azeotropic cosolvents or in the absence of azeotropic solvents.

An additional feature of the present invention is to provide a process for direct use of polyarylether containing reactor solutions in the preparation of membranes.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a process for making polyarylethers. The process includes reacting polyarylether forming reactants in a reactor solution comprising at least one polar aprotic solvent and the polyarylether forming reactants with maintaining of the desired reaction temperature in the polar aprotic solvent, and with removing of water (e.g., by distillation, by vacuum, by sweeping with inert gas, evaporation, or perevaporation, or other techniques) in the absence of any azeotrope forming cosolvent and optionally adding fresh polar aprotic solvent to the reactor solution, optionally in a substantially equal amount to any amount removed from the reactor solution during the reacting. The polar aprotic solvent is dimethylacetamide, N-methylpyrrolidone, dimethylsulfoxide, diphenylsulfone, or any combinations thereof.

The present invention can further relate to the indicated process wherein the adding of fresh polar aprotic solvent during the reacting to replace any amount removed can maintain solvent concentration of the solvent in the reactor solution to within ±10% of a starting concentration thereof throughout the reacting, and preferably ±1% of starting concentration. Or, in the alternative, no replacement polar aprotic solvent is added (e.g., no replenishment) and/or excess solvent can be initially present to compensate for any losses during the reaction. Any of these methods permit the reaction to be conducted at temperatures in excess of the boiling point of the polar aprotic solvent, thus speeding removal of the water by-product and increasing reaction rate.

The present invention also relates to polyarylether forming reactants of the indicated process comprising a dihydroxyaromatic compound, a dihaloaromatic compound, a weak base, and at least one polar aprotic solvent. The present invention further relates to the polyarylether forming reactants comprising (i) a bisphenol and (ii) dihalobenzenoid, and (iii) alkali metal carbonate. The present invention further relates to the indicated process where the reaction is conducted for from about 5 hours to about 70 hours, or about 22 to about 30 hours, or other durations.

The present invention further relates to the indicated process for producing a polyarylether that can be polysulfone, polyethersulfone, polyarylsulfone, or any combinations thereof. The polyarylether produced can have a weight average molecular weight, for example, of from about 40,000 to about 120,000, or from about 60,000 to about 85,000, or other molecular weights.

The present invention further relates to making a membrane, such as a flat sheet or hollow fiber, with the polyarylether containing reactor solution produced by the indicated process. After polymerization and prior to membrane casting or fiber spinning, the reaction mixture is processed to remove excess base and metal halide salts formed by the reaction. The membrane can be made by directly spinning the reactor solution (after processing of the reactor solution) through a spinneret to form hollow fibers without previously isolating the polyarylether product of the reacting from the polar aprotic solvent. The present invention also relates to directly making a coating with the reactor solution after the reacting without previously isolating the polyarylether product of the reacting from the polar aprotic solvent. The present invention further relates to a dialyzer comprising a product of the indicated process.

For purposes herein, "fresh solvent" refers to close to 100% pure dipolar aprotic solvent separately obtained from a source other than the reactor or its condensed effluents.

An "azeotrope forming cosolvent" refers to a solvent that forms an azeotrope (a mixture with a boiling point lower than that of either of the constituent solvents) with water and a polar aprotic solvent, wherein the cosolvent is not a polar aprotic solvent. The azeotrope forming co solvent can refer to, for example, toluene, chlorobenzene, benzene, xylene, ethylbenezene, and the like.

The term "in the absence of an azeotrope forming cosolvent" means below an effective amount of azeotrope forming cosolvent. The reactor solution can be 100% free of azeotropic cosolvent or any amount of azeotropic type cosolvent that may be present is ineffective for detectible formation of an azeotrope with water and a polar aprotic solvent to occur in the reactor solution, and thus an azeotrope forming cosolvent is absent in either situation.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain the principles of the present invention. The drawings are not necessarily drawn to scale. Like numerals in the drawings refer to like elements in the various views.

DETAILED DESCRIPTION OF THE PRESENT INVENTION

The present invention relates to preparation of polyarylethers without use of azeotropic cosolvents. The absence of azeotropic cosolvents in the polyarylether reactor solution eases solvent recovery requirements. Further, the absence of azeotropic cosolvents in the polyarylether reactor solution permits the direct use of such reactor solutions in the preparation of membranes and coatings without the need to isolate the polymer product from the azeotropic solvent or other solvent before product preparation. The ability to make polyarylether polymers, including commercially important polyarylether polymers, by using a dipolar aprotic solvent without the use of any azeotropic cosolvent, can make polymer recovery and solvent recovery schemes more economically attractive. These advantages can apply for production schemes involving the direct formation of membranes, coatings, or other structures, from the polyarylether reactor solutions without need to pre-isolate the polymer from solvent used in the reaction. Polymer solutions containing azeotropic cosolvents can be expected to cause problems in the manufacture of good quality membranes, such as due to the insolubility of azeotropic cosolvents in water. High quality, high molecular weight polyarylether membranes can be made from the direct use of a polyarylether reactor solutions obtained with processes of the present invention which can avoid such problems associated with azeotropic cosolvents.

The present invention includes the following aspects/embodiments/features in any order and/or in any combination:

1. The present invention relates to a process for preparation of at least one polyarylether comprising reacting polyarylether forming reactants in a reactor solution comprising polar aprotic solvent(s) and the polyarylether forming reactants with maintaining of the desired reaction temperature of the polar aprotic solvent(s), and with removing of water in the absence of azeotrope forming cosolvent and optionally adding fresh polar aprotic solvent to the reactor solution, optionally in substantially equal amount to polar aprotic solvent removed from the reactor solution during the reacting, wherein the polar aprotic solvent is dimethylacetamide, N-methylpyrrolidone, dimethylsulfoxide, diphenylsulfone, or any combinations thereof.

2. A process for preparation of at least one polyarylether comprising reacting polyarylether forming reactants in a reactor solution, said reaction solution comprising at least one polar aprotic solvent and the polyarylether forming reactants with removing of water in the absence of azeotrope forming cosolvent and optionally adding fresh polar aprotic solvent to the reactor solution, wherein the polar aprotic solvent is dimethylacetamide, N-methylpyrrolidone, dimethylsulfoxide, diphenylsulfone, or any combinations thereof.

3. A process for preparation of at least one polyarylether comprising reacting polyarylether forming reactants in a reactor solution, said reaction solution comprising at least one polar aprotic solvent and the polyarylether forming reactants with removing of water in the absence of azeotrope forming cosolvent and optionally adding fresh polar aprotic solvent to the reactor solution, wherein the polar aprotic solvent is dimethylacetamide, N-methylpyrrolidone, dimethylsulfoxide, diphenylsulfone, or any combinations thereof, said process is conducted with a stoichiometric excess of one of the two polyarylether forming reactants such that the final product contains substantially less of the stoichiometrically deficient reactant and the reaction is self-terminating.

4. The process of any preceding or following embodiment/feature/aspect, wherein the adding of fresh polar aprotic solvent during the reacting to replace polar aprotic solvent removed maintains solvent concentration of the solvent in the reactor solution within ±10% or better (e.g., ±1%) of a starting concentration thereof throughout the reacting.

5. The process of any preceding or following embodiment/feature/aspect, comprising adding the fresh polar aprotic solvent to the reactor solution in substantially equal amount to any polar aprotic solvent removed from the reactor solution during the reacting.

6. The process of any preceding or following embodiment/feature/aspect, wherein the polar aprotic solvent is dimethylacetamide.

7. The process of any preceding or following embodiment/feature/aspect, wherein the at least one polyarylether is polysulfone.

8. The process of any preceding or following embodiment/feature/aspect, wherein the at least one polyarylether is polyethersulfone.

9. The process of any preceding or following embodiment/feature/aspect, wherein the at least one polyarylether is polyphenylsulfone.

10. The process of any preceding or following embodiment/feature/aspect, wherein the polyarylether forming reactants comprise a dihydroxyaromatic compound, a dihaloaromatic compound, a weak base, and a polar aprotic solvent(s).

11. The process of any preceding or following embodiment/feature/aspect, wherein the polyarylether forming reactants comprise (i) a bisphenol and (ii) dihalobenzenoid, and (iii) alkali metal carbonate.

12. The process of any preceding or following embodiment/feature/aspect, wherein the polyarylether forming reactants comprise (i) stoichiometrically unbalanced amounts of bisphenol and dihalobenzenoid, and (ii) alkali metal carbonate.

13. The process of any preceding or following embodiment/feature/aspect, wherein the reacting is conducted for about 5 to about 70 hours.

14. The process of any preceding or following embodiment/feature/aspect, wherein the reacting is conducted for about 22 to about 30 hours.

15. The process of any preceding or following embodiment/feature/aspect, wherein polyarylether produced by the reacting has a weight average molecular weight of from about 40,000 to about 120,000.

16. The process of any preceding or following embodiment/feature/aspect, wherein polyarylether produced by the reacting has a weight average molecular weight of from about 60,000 to about 85,000.

17. The process of any preceding or following embodiment/feature/aspect, further comprising making a membrane with polyarylether product of the reacting.

18. The process of any preceding or following embodiment/feature/aspect, further comprising making a flat sheet or hollow fiber with polyarylether product of the reacting.

19. The process of any preceding or following embodiment/feature/aspect, further comprising directly spinning the processed reactor solution after pumping the processed reactor solution through a spinneret to form hollow fibers without previously isolating polyarylether product of the reacting from the polar aprotic solvent.

20. The process of any preceding or following embodiment/feature/aspect, further comprising directly spinning the processed reactor solution after pumping the processed reactor solution through a spinneret to form hollow fibers without previously isolating polyarylether product of the reacting from the polar aprotic solvent, wherein the polyarylether product is polysulfone, polyethersulfone, polyphenylsulfone, or any combinations thereof.

21. The process of any preceding or following embodiment/feature/aspect, further comprising directly making a coating with the reactor solution with or without a supporting substrate, after the reacting without previously isolating polyarylether product of the reacting from the polar aprotic solvent.

22. A product of the process of any preceding or following embodiment/feature/aspect.

23. A dialyzer comprising a product of any preceding or following embodiment/feature/aspect.

The present invention can include any combination of these various features or embodiments above and/or below as set forth in sentences and/or paragraphs. Any combination of disclosed features herein is considered part of the present invention and no limitation is intended with respect to combinable features.

The reaction of the processes of the present invention can provide a reaction mixture comprising a polar aprotic solvent(s) for polyarylether and polyarylether forming reactants. The polyarylether-forming reactants can be reacted with removal of water byproduct in the absence of azeotrope forming cosolvent. The removal of the water can be accomplished by any technique, such as, but not limited to, distillation, vacuum, sweeping with an inert gas, evaporation, perevaporation, or other techniques. The polar aprotic solvents can be, for example, polar aprotic solvents in the polyarylether reactions, which boil at temperatures above 100° C. Where the polar aprotic solvent is dimethylacetamide (b.p.: 165° C.), for example, the reaction temperature can be maintained either below or above the boiling point. The amount of distillate (or removed water with polar aprotic solvent) generated during the reaction as water byproduct and polar aprotic solvent, can be optionally refreshed, for instance, with substantially equal amounts of fresh polar aprotic solvent during the reaction. The amount of refreshment of the polar aprotic solvent can maintain the amount of polar aprotic solvent, for example, within ±10%, or within ±5%, or within ±2.5%, or within ±1%, of the original amount thereof throughout the course of the reaction, based on the vol % or concentration of the polar aprotic solvent present in the reaction.

As an option, or in the alternative, or in addition, no refreshment of the polar aprotic solvent occurs. As one option, excess polar aprotic solvent can be present to compensate for any loss of polar aprotic solvent during the reaction. For instance, an excess of 1% by weight or more, such as more than 2% by weight, more than 5% by weight, more than 10% by weight, more than 15% by weight, or more than 20% by weight polar aprotic solvent can be present to compensate for any losses of the polar aprotic solvent during the removal of the water during the reaction.

A process of preparing the polyarylether forming reactants can comprise, for example, reacting bisphenol and dihalobenzenoid, and alkali metal carbonate, in a polar aprotic solvent, with heating of the resulting reactor solution to a temperature at which distillation of water byproduct of the reaction in the absence of azeotrope forming cosolvent in the polyarylether reactions (e.g., toluene, chlorobenzene, xylene, benzene, ethylbenzene, and the like) can occur. As indicated, the reactor solution can be 100% free of azeotropic solvent or any amount of azeotropic type cosolvent that may be present is ineffective for detectible azeotrope formation to occur in the reactor solution, and thus azeotrope forming cosolvent is absent in either case. For example, impurity levels or other miniscule amounts of azeotropic type cosolvent (e.g., less than 1% by weight, or less than about 25 ppm, or less than about 5 ppm, or less than about 1 ppm) in the reactor solution may be amounts of an azeotropic type solvent which are ineffective for detectible azeotrope formation with water and the polar aprotic solvent in the reactor solution system. The distillate produced by the reaction, for example, can primarily be water byproduct of the reaction. The distillate also can contain polar aprotic solvent. As indicated, the amount of distillate (e.g., total water, solvent, or other distilled components) separated from the reactor solution during the reaction can be replaced with substantially equal amounts of fresh polar aprotic solvent throughout the course of the reaction. This refreshment of solvent can maintain substantially the same concentration of polar aprotic solvent during the reaction.

The process of the present invention can be used to make polyarylethers. The first step can involve charging all of the raw materials into a suitable reactor vessel to form a reaction mixture. The process can be conducted, for example, in a batch reactor. Typical reactor vessels can have laboratory scale capacities, or commercial capacities, for example, capacities up to 20,000 gallons or more. Any of the conventional reactor vessels used for industrial scale production of polyarylethers may be used. For example, standard glass-lined reactor vessels can be suitable. Also useful are laboratory or bench scale cylindrical reactor flasks fitted with an agitator through a vacuum tight connection, which can be placed in an oil bath whose temperature can be controlled with a temperature controller. The reactor can be initially purged with nitrogen or other inert gas to ensure that the atmosphere inside the reactor is substantially free of oxygen. For the purpose of this specification, a substantially oxygen-free atmosphere can be one that contains less than about 200 ppm, or one that contains less than about 50 ppm or one that contains less than about 20 ppm.

The initial reactor solution charged to the reactor can contain a dihydroxyaromatic compound(s), a dihaloaromatic compound(s), a weak base(s), and a polar aprotic solvent(s). A more particular reaction mixture can comprise bisphenol, dihalobenzenoid, alkali metal carbonate, and a polar aprotic solvent which is dimethylacetamide (DMAC), N-methylpyrrolidone (NMP), dimethylsulfoxide (DMSO), diphenylsulfone (DPS), or any combinations thereof. Substantially equimolar amounts of bisphenol and dihalobenzenoid can be used (e.g., about 1.1:0.9 to about 0.9:1.1 mol/mol), or other molar ratios thereof. Maintenance of the ratio of bisphenol to dihalobenzenoid below 1.0 to 1.0 can substantially reduce the amount of unreacted bisphenol in the final product. These ingredients can be charged into the reaction vessel in any order without limitation. Introduction of the liquid polar aprotic solvent first may be practically useful, such as for purposes of facilitating agitation of other added components during charging of the reactor. After charging of the raw materials, the reactor can be again purged with a suitable inert gas, such as nitrogen, one or multiple times, and a nitrogen gas or other inert gas flow can be bubbled through the reactor solution during the reaction, to ensure that the reactor atmosphere is substantially oxygen free as previously defined.

The liquid reaction solution then can be heated to a temperature that is sufficient to form a heated reaction solution and a vapor. Formation of the polyarylether can take place in the heated reaction solution and the vapor can be removed from the reaction vessel as an overhead vapor stream. The temperature of the heated reaction solution can be, for example, from about 100° C. to about 250° C. and above or below the boiling point of the polar aprotic solvent. The temperature of the overhead vapor stream can range, for example, from about 100° C. initially to about 200° C. as the reaction nears completion. The reactor solution can be maintained within the elevated temperature range for a sufficient time to form the desired polyarylether. The duration of the reaction can be conducted, for example, for from about 5 to about 70 hours, or from about 25 hours to about 50 hours, or from about 28 to about 40 hours, or from about 22 hours or about 30 hours. The duration of the reaction can be controlled to provide polymer products of the desired molecular weight. This time period can vary, for example, depending on the particular polyarylether forming reactants, polar aprotic solvent, and reaction temperature, used in the reaction solution. Essentially all of the water that is formed as a by-product can be removed from the reaction mixture (e.g., 98% to 100 wt % of all water removed). During this reaction period, fresh polar aprotic solvent can be added to the reactor to maintain a constant concentration. For instance, fresh polar aprotic solvent can be added in substantially the same amount as the amount of distillate removed from the system. The amount of fresh polar aprotic solvent replenishes the amount of solvent lost in the distillate and compensates for the amount of water separated out of the system as distillate. The replenishment of the solvent can be done continually or periodically. It is possible that polar aprotic solvent which is removed in the vapor stream can be separated from the water and recycled to the reaction vessel. Addition of fresh or processed polar aprotic solvent can also be used. When desired molecular weights of polyarylether product are obtained, the reaction can be stopped by addition of organic chloride, such as methyl chloride or organic acid, such as glacial acetic acid, dissolved in polar aprotic solvent. If a stoichiometric excess of one of either bisphenol or dihalobenzenoid is used, the reaction will terminate spontaneously without addition of any reagent. The reactor solution can be agitated to homogenize the contents of the reactor, and may then be filtered to remove by-product and then processed according to procedures for making membranes, coatings, etc., without requiring isolation of the polymer product from the polar aprotic solvent in the reactor solution. As indicated, alkali metal halide is produced in the reaction as a byproduct. This can be removed, for example, by filtering out the alkali metal halide from the reactor contents. The filtering off of the KCl can be provided, for example, such as by filtering the reactor contents through a sintered metal filter disk (e.g., approx. 2.0 micron) under nitrogen pressure to provide a polymer solution suitable for membrane manufacturing.

The dihydroxyaromatic compound which can be used as a polyarylether forming reactant can be a single type of dihydroxyaromatic material, such as bisphenol A, hydroquinone, or a combination of different dihydroxyaromatic compounds. The dihydroxyaromatic compound can be a mono-nuclear, di-nuclear or polynuclear aromatic compound in which benzene nuclei are fused together or linked through a valence bond or linking group, such as alkylene or alkylidene (e.g., isopropylidene). Bisphenols can be, for example, hydroquinone and bisphenols of formula:

in which Y is a direct link, oxygen, sulfur, —$SO_2$—, —CO—, or a divalent hydrocarbon radical. Bisphenols can include, for example, 4,4'-dihydroxybenzophenone, 4,4'-dihydroxydiphenylsulphone, 2,2-bis-(4-hydroxyphenyl)propane, 4,4'-dihydroxybiphenyl, or any combinations thereof. Examples of such dihydroxyaromatic compounds appear in U.S. Pat. Nos. 4,105,636; 4,108,837; 5,047,496; and 5,144,001, all of which are incorporated in their entireties by reference herein. Dihydroxy di-nuclear aromatic compounds such as bisphenol A or biphenol can be preferred in making polyarylene polyethers and they have high glass transition temperatures. Other suitable dihydroxyaromatic compounds include, for example, resorcinol, bisphenol F, bisphenol S, various dihydroxynaphthalenes, dihydroxyanthracenes, and alkyl, aryl, and halo substituted variations on the aforementioned compounds.

The dihaloaromatic compound which can be used as a polyarylether forming reactant can be a single type of dihaloaromatic material, such as 4,4'-dichlorodiphenylsulfone, or a combination of dihaloaromatic materials. The dihaloaromatic compound can have the formula:

in which X and X', which may be the same or different, are halogen atoms and are ortho or para to the groups Q and Q', Q and Q', which may be the same or different, are —CO— or —$SO_2$—, Ar is a divalent aromatic radical, and n is 0, 1, 2 or 3. The aromatic radical Ar can be a divalent aromatic radical selected from phenylene, biphenylylene or terphenylylene, and diphenyl ether. Dihaloaromatic compounds can include, for example, 4,4'-bis-(4-halophenylsulphonyl)diphenyl ethers, 4,4'-bis-(4-halobenzoyl)diphenyl ethers and dihalides. Examples of dihaloaromatic compounds include 4,4'-dichlorodiphenylsulphone, 4,4'-difluorodiphenylsulphone, 4,4'-dichlorobenzophenone, 4,4'-difluorobenzophenone, bis-4,4'-(4-chlorophenylsulphonyl)biphenyl, 1,4-bis-(4-chlorobenzoyl)benzene, 4,4'-bis-(4-chlorophenylsulphonyl)diphenyl ether, bis-4'-(4-chlorophenylsulphonyl)biphenyl sulphone, or any combinations thereof. Mixtures of dihaloaromatic compounds may be employed so as to produce copolymers. Examples of mixtures that may be employed include 4,4'-dichlorodiphenylsulphone with 4,4'-dichlorobenzophenone or bis-4'-(4-chlorophenyl sulphonyl)biphenyl. The dihaloaromatic compound can be a di-chloro bridged di-nuclear compound, such as 4,4'-dichlorodiphenylsulfone or 4,4'-dichlorodiphenyl ketone. Other suitable dihaloaromatic compounds are described in U.S. Pat. Nos. 4,105,636; 4,400,499; 5,047,496; and 5,144,001, all of which are incorporated in their entireties by reference herein.

The weak base can be introduced into the reactor solution as a dry powder or other solid particulate. The weak base can be an alkali metal carbonate. Exemplary weak bases include, for example, sodium carbonate, potassium carbonate, cesium carbonate, rubidium carbonate, or any combinations thereof. The term "weak base" as used herein is intended to refer to bases that are relatively weak in comparison to strong bases, such as potassium hydroxide and sodium hydroxide.

The polar aprotic solvents used in this invention include sulfur-containing and nitrogen containing solvents which are suitable for the manufacture of polyarylethersulfones of the present application. As indicated, the polar aprotic solvent can be dimethylacetamide, N-methylpyrrolidone, dimethylsulfoxide, diphenylsulfone, or any combinations thereof. Blends of the above solvents may be used, if desired.

The relative amounts of polyarylether forming reactants and solvent that are charged to the reactor can be varied to achieve the optimum yield of polymer product. Further, the ratios of the starting ingredients are varied in order to control the degree of polymerization (Dp) and hence the molecular weight of the polyarylene polyether formed in the reaction. The polyarylether produced can have a weight average molecular weight of from about 40,000 to about 120,000, or from about 60,000 to about 85,000, or from about 62,500 to about 80,000, or from about 65,000 to about 75,000, or from about 67,500 to about 72,500, or other molecular weights.

Polyarylether polymers that can be made by the processes of the present invention can be, for example, sulfone polymers. Sulfone polymers include the subunit: aryl-S(=O)$_2$-aryl, wherein the aryl groups independently can be, for example, phenyl, diphenyl, and like aromatic radicals. Sulfone polymers, for example, can include the diphenylsulfone group of the following formula I:

The sulfone polymers produced by the processes of the present invention can be, for example, a polysulfone, polyethersulfone, polyarylsulfone, or any combinations thereof.

Polysulfone can have the repeat unit of the following formula II:

[—O-ø-O-ø-S(=O)$_2$-ø-]$_n$ wherein the ø groups can be phenyl, diphenyl, diphenylalkyl, and the like aromatic radicals, and "n" can be a positive integer. A polysulfone of formula (II), for example, can have the repeat unit of the following formula II(a):

Polyethersulfone can have the following repeat unit of the following formula III, and "m" can be a positive integer:

The polysulfones can be constituted, for example, by units of the formulae II alone, III alone, or both (i.e., copolymers thereof). The phenyl groups in these formulae II and III independently can be non-substituted or substituted. If substituted, the phenyl groups can, for example, have 1-4 substituents which are independently selected from hydrogen, $C_1$ to $C_6$ alkyl, or $C_4$ to $C_8$ cycloalkyl. The polysulfones have no substituents on the phenyl groups in compounds of one particular embodiment of the present invention. For homopolymers comprising units of formula II or formula III, or copolymers including both repeat units, n, m, or both can be selected to provide a polymer having any of the above indicated weight average molecular weights for the polyarylether products. These polysulfones may be used separately or as blends.

Other polyarylsulfone polymers that can be provided by the present invention comprise, for example, units of formula I and at least one of the following formulae IV and V:

where the units I, IV and/or V can be attached to each other by an ether linkage (—O— bond), and the phenyl groups in these formulas independently can be non-substituted or substituted with the indicated substituents. As an option, the polyarylsulfones have no substituents on the phenyl groups. The polymers comprising units of formula I and at least one of formulas IV and V can be random or ordered.

For some membrane producers, control of the level of cyclic dimer of polysulfone, e.g., a cyclic dimer of two units of formula I, II and/or III, can be important to their processing efficiencies and fiber quality. Too much cyclic dimer can result in filtered spinning solutions becoming cloudy, white solid material clogging the process filters, or both. Polyarylethers, such as the indicated polymers containing sulfones, made by processes of the present invention, can contain low amounts of cyclic dimers, such as less than about 1.5% by weight of cyclic dimer. Further, even if aged, the reactor solutions of the processes of the present invention can remain clear or essentially clear as the amount of precipitation can be small if any. As indicated, control of the level of KCl by-product in the reaction products, such as by filtration, also can be useful.

Before making the membrane, the reactor solution can be subjected to filtration. Membranes can be made with the reactor solutions of the present invention. The membranes can be, for example, flat sheet or hollow fiber. The membranes can be used, for example, for dialysis membranes, ultrafiltration membranes, and microfiltration membranes. The dialysis membranes can be, for example, hemodialysis membranes.

Semi-permeable membrane filtration is often used in the purification of proteins, microfiltration and ultrafiltration being the most commonly practiced techniques. Microfiltration can be defined as a low pressure membrane filtration process which removes suspended solids and colloids generally larger than 0.1 μm in diameter. Such processes can be used to separate particles or microbes that can be seen with the aid of a microscope such as cells, macrophage, and cellular debris. Ultrafiltration membranes are characterized by pore sizes which enable them to retain macromolecules having a molecular weight ranging from about 500 to about 1,000,000 daltons. Ultrafiltration is a low-pressure membrane filtration process which separates solutes in a range of from about 0.01 μm to 0.1 μm. Ultrafiltration can be used for concentrating proteins, and removing bacteria and viruses from a solution. Ultrafiltration also can be used for purification treatments, such as water purification. Dialysis membranes can be ultrafiltration membranes which comprise biocompatible materials, such as polyarylether polymer materials shown herein. When the membranes are hollow fibers, the hollow fibers can be microporous and capable of withstanding from about 100 psi to about 2,000 psi or more applied pressure without collapse. The polyarylether products made by processes of the present invention also can be used to form polymeric sheets and coatings on surfaces. As used herein, a "sheet" can be unitary self-supporting article, while a coating is attached to a substrate surface.

A hollow fiber of the present invention that can be used for dialysis, such as hemodialysis, can have desirable properties including, for example, one or more of biocompatibility, high hydraulic permeability, a sharp separation characteristic, a satisfactory degree of mechanical strength to resist the pressures involved, and an excellent stability. Hollow fibers having these properties can be directly made with polyarylether polymers in reactor solutions of processes of the present invention. Methods for directly making hollow fibers with the reactor solutions include spinning methods. The spinning methods can be for, example, wet spinning or dry spinning methods.

In wet spinning hollow fibers, for example, the polymer-fiber forming substances are pre-dissolved or dissolved in solvent to provide a casting solution that can be spun through a ring duct of a spinneret having an external ring duct and a hollow core through which a precipitating solution is simultaneously fed, and the solutions are cast into an aqueous bath separated from the spinneret by an air gap where precipitation of fiber components occurs. A substantial portion of the solvents can be dissolved and washed out of the fibers formed, and the fibers can be collected, dried, and cut to desired lengths. In dry spinning, instead of precipitating the polymer by dilution or chemical reaction, solidification may be achieved by evaporating the solvent in a stream of air or inert gas.

For wet spinning, the spinning solvent in the casting solution can be the polar aprotic solvent in which the polyarylether polymers are synthesized. The polyarylether polymer products of the reaction, alternatively and although not generally required for purposes of the present invention, can be isolated from the reaction solvent, and redissolved in fresh solvent for wet spinning. Whether directly used in the reactor solution solvent in wet spinning, or alternatively as isolated from the reactor solvent and redissolved in fresh solvent the polyarylether polymer can have a preferred concentration range in the solvent used as the casting solution. For example, in the case of a fiber forming polymer content in the solvent that is too low, the hollow fibers formed may not be strong enough to handle further processing. On the other hand, if the level of the fiber forming polymer in the solution is excessive, the spun fibers may be overly dense which can make for less satisfactory hydraulic properties. The polyarylether polymer can be present in polar aprotic solvent in concentrations, for example, of from about 12% to about 20% by weight, or from about 13% to about 19% by weight, or from about 14% to about 18% by weight, or other concentrations, in the casting solution.

The casting solution also can include at least one polymer other than the polyarylether polymer made by the indicated process of the present invention. A different polymer, if included, can be, for example, a hydrophilic second polymer, for example, which effects pore formation, e.g., to make the fiber more readily wettable, or other advantages, when a predominantly hydrophobic fiber forming polyarylether polymer is precipitated or coagulated. The optional hydrophilic second polymer (e.g., polyvinylpyrrolidone) can be used in an amount of from about 2% to about 15% by weight, or from about 2.5% to about 10% by weight, of the casting solution, and being an amount compatible with viscosity limits for the composition of the casting solution. The hydrophilic second polymer can be, for example, a long-chained polymer, that contains recurrent inherently hydrophilic polymeric units. Such hydrophilic second polymers can be polyvinylpyrrolidone (PVP). PVP can be produced, for example, by the polymerization of N-vinyl-2-pyrrolidone, the degree of polymerization being dependent on the selection of polymerization method. For example, PVP products can be produced or commercially obtained with a weight average molecular weight of from about 10,000 to about 1.5 million (such as 100,000 to 1 million), which can be used for the purposes of the present invention. PVP of these forms can be commercially obtained, for example as K-30 to K-90 (e.g., K-30, K-60, K-90, etc.) or mixtures thereof from International Specialty Products, Wayne, N.J. Other hydrophilic second polymers that can be used can be polyethylene glycol, polyglycol monoesters, and copolymers of polyethylene glycols with polypropylene glycol, as, for example, the polymers that are commercially available as PLURONIC® F68, F88, F108 and F127, from BASF, Mount Olive N.J.

The casting solution containing the fiber forming polyarylether polymer, and any optional second hydrophilic polymer(s), and the solvent, can have a viscosity, for example, of from about 500 to 10,000 cps or higher and more specifically 1,500 to 5,000 cps (centipoise) at about 40° C. These viscosity values can be measured with a standard rotary viscosity measuring instrument, such as a Haake VT-550 or Brookfield HADV-II+Pro instrument. The casting solution containing the fiber forming polyarylether polymer, and any optional other polymer, and the solvent, the fiber forming polymer, and any optional second hydrophilic polymer, can be freed of undissolved particles, if present, by filtering it, and can then be supplied to an extrusion or wet-spinning spinneret.

A wet-spinning spinneret which can be used for spinning hollow fibers of the present invention can be types, for example, shown in U.S. Pat. Nos. 3,691,068; 4,906,375; and 4,051,300, all of which are incorporated in their entireties by reference herein. The indicated casting solution containing the fiber forming polyarylether polymer, and any optional second hydrophilic polymer, and the solvent, can be pumped to an annular extrusion spinneret having concentric tubes. For example, as water membrane spinning dimensions the outer diameter orifice can be from about 0.3 mm to 0.5 mm and the inner diameter can be from about 0.2 mm to about 0.4 mm, or other suitable sizes. The casting solution (or polymer solution) can be supplied to the spinneret simultaneously with a precipitating solution to form a spinning composition. The precipitating solution can comprise water, other suitable diluent, or combinations thereof. The precipitating solution can be, for example, a mixture of 70% to 30% by weight water and about 30% to about 70% by weight organic solvent, such as a polar aprotic solvent, such as at least one of the types indicated herein, or other suitable organic solvent.

The spinneret or nozzle, for example, can have a ring duct with a diameter equaling or approximating the desired outer diameter of the hollow fiber. A spinneret hollow core can typically project coaxially into and through this duct through which the precipitating solution is fed simultaneously with casting solution being fed between the outer surface of the hollow core and inner bore of the ring duct. In this respect, the outer diameter of the hollow core can generally be equal to or approximate the desired inner diameter of the hollow fiber, that is to say, the lumen diameter thereof. The precipitating solution, which is further described hereafter, can be pumped through this hollow core so that the precipitating solution emerges from the core tip and makes contact with the hollow fiber configuration that is made up of the extruded casting solution. The precipitating solution can comprise water alone or water in combination with an organic solvent, such as a polar aprotic solvent or other suitable organic and/or inorganic solvent(s). The precipitating solution can initiate the precipitation of the fiber building polymer in the casting solution (polymer solution). A polar aprotic solvent or mixture thereof, if used in the precipitating solution, can be the same or different type as the polar aprotic solvent(s) present or used in the casting solution containing the fiber forming polymer. The precipitating solution can contain an inorganic solvent, such as water, in an amount at least about 10% by weight, in order to make possible precipitation to the desired degree. In this respect, the precipitating solution can mix with the solvent of the casting solution containing the polymer, such that the greater the distance from the inner face of the hollow fiber, the lower the water content in the polar aprotic solvent. Since the fiber itself preferably is fully precipitated before the washing bath solution is applied to it, the above indicated minimum water content in the precipitating liquor can apply. If the content of the inorganic solvent in the precipitating solution is too low, as for example, at a level of less than about 25% by weight, a membrane with large pores may be produced, which, for example, when used as a plasma filter only may retain relatively large fractions in the blood such as erythrocytes. The precipitating solution preferably can contain at least about 30% by weight water content.

The amount or ratio of the precipitating solution supplied to the casting solution in the spinneret can be dependent, for example, on the dimensions of the wet-spinning spinneret, that is to say, the dimensions of the finished hollow fiber. In this respect, it can be desirable that the dimensions of the fiber upon precipitation are not changed from those of the hollow fiber configuration before precipitation but after extrusion. The ratios of the volumes used of precipitating solution to casting solution can be in a range, for example, of from 1:0.5 to 1:2, given an equal exit speed of the precipitating solution and of the casting solution, to the area ratios of the hollow fiber, i.e. the ring-area formed by the polymeric substance and the area of the fiber lumen. The precipitating solution can be supplied to the extruded configuration directly upstream from the spinneret such that the inner or lumen diameter of the extruded and not yet precipitated configuration generally corresponds to the dimensions of the ring spinneret, from which the material is extruded. It can be useful if the outer diameter of the hollow fibers, for example, is equal to about 0.1 to about 0.5 mm, whereas the thickness of the membrane can be about 10 to 100 μm or from about 15 to 50 μm. A hollow fiber or capillary membrane can be formed by the precipitating solution acting in an outward direction on the polymer solution after issuing from the wet-spinning spinneret. The precipitation can be generally completed before the hollow fiber gets as far as the surface of a rinsing bath that dissolves out the organic liquid contained in the hollow fiber and finally fixes the fiber structure. When precipitation takes place, the first step can be for the inner face of the fiber-like structure to be coagulated so that a dense microporous layer in the form of a barrier for molecules that are larger than 30,000 to 60,000 Daltons (or any size range in between) can be formed. With an increase in the distance from this barrier, there is an increasing dilution of the precipitation solution with the solvent contained within the spinning composition so that the precipitation properties become less vigorous in an outward direction. A consequence of this can be that a coarse-pored, sponge-like structure is formed in a radially outward direction which can function as a supporting layer for the radially inner membrane.

When precipitation takes place, most of the second hydrophilic polymer, if used, is dissolved out of the spinning composition, whereas a minor fraction can be retained in the coagulated fiber and may not be extracted therefrom. The dissolving out of the second polymer can facilitate the formation of pores. A useful effect can be produced if a predominant amount of the second hydrophilic polymer, if used, is dissolved out of the spinning composition, and the remainder is retained within the coagulated fiber. If the second hydrophilic polymer is used, from about 60 to about 95% of the second polymer can be dissolved out of the spinning composition so that only from about 40 to about 5% by weight of the second polymer used can be left therein. For example, if the second polymer is PVP, from about 80% to about 85%, or about 83%, of added PVP is washed out. Where less than 30% by weight of the originally used second hydrophilic polymer is left in the fiber, the finished polymer in the fiber can contain from about 90 to about 99%, or from about 95 to about 98% by weight of the polyarylether polymer, and the rest can be the second hydrophilic polymer.

As indicated, the second hydrophilic polymer(s), such as PVP, if used, can be dissolved out of the spinning composition during the precipitation operation and remains in a dissolved condition in the precipitating solution, which may affect the precipitation conditions, because the solvent properties of the second hydrophilic polymer can have an effect on the overall characteristics of the precipitating solution. The second hydrophilic polymer, if used, together with the solvent components of the precipitating solution, is involved in the control of the precipitation reaction. The draft ratio can be, for example, from about 1.5 to 2.5, or about 2.0, or other values. As an option, the pumping rate of the precipitative fiber can be slower than the draw rate from the spinneret, which causes a drawing of the fiber, which reduces the diameter of the fiber. This drawing or pulling can optionally be used to form the fiber.

A further spinning parameter is the distance between the surface of the rinsing bath and the spinneret, because such distance is controlling for the precipitation time at a given speed of downward motion, that is to say, a given speed of extrusion. However, the precipitation height is limited, because the weight of the fiber represents a certain limit, which if exceeded will cause the fiber structure, so far not precipitated, to break under its own weight. This distance can be dependent on the viscosity, the weight and the precipitation rate of the fiber. The distance between the spinneret and the precipitating bath can be set at a distance, for example, of no greater than about one meter. After precipitation the coagulated fiber can be rinsed in a bath that normally contains water and in which the hollow fiber is kept for up to about 30 minutes, such as for about 10 to 20 minutes, for washing out the dissolved organic constituents and for fixing the microporous structure of the fiber. After that, the fiber can be passed through a hot drying zone. The hollow fiber produced can have a thin radially inner barrier layer on the inside surface which is adjacent an outer open-pore support layer. For example, where the second hydrophilic polymer is included in the spinning solutions, the inner face fiber manufactured can comprise a microporous barrier layer which has a pore diameter, for example, of from about 1 to about 2 nanometers, or other values, for dialysis membranes. Ultrafiltration/microfiltration membranes can have higher pore sizes. Adjacent this inner barrier layer on the outside thereof, there can be a foam-like supporting structure.

The hollow fiber can be texturized in order to improve the exchange properties thereof. After this, the fiber so produced can be handled in conventional manners, for example, by winding onto a bobbin, cutting the fibers to a desired length, and/or used in manufacture of dialyzers from the cut fiber in conventional manners.

The reactor solution containing the polyarylether product and solvent can be extruded or cast to form sheet forms. Methods and equipment suitable for casting membrane films or sheets using the reactor solutions of the present invention include those, for example, such as described in the indicated U.S. Pat. No. 3,691,068. The reactor solution containing the polyarylether product and solvent also can be coated and solidified in place as a continuous or discontinuous coating or film on a substrate surface (e.g., woven or non-woven).

The water permeability of the membranes as produced can be evaluated by determining the ultrafiltration coefficient (KUF). The KUF is defined as the number of milliliters of fluid per hour that will be transferred across the membrane per mm Hg pressure gradient across the membrane. Hollow fiber membranes produced can have a water permeability (KUF per area), for example, of from about 30 to about 600 ml/hr.mm Hg.m$^2$, or from about 100 to about 300 ml/hr.mm Hg.m$^2$, or from about 150 to about 250 ml/hr.mm Hg.m$^2$, or other values. The ultrafiltration coefficient can be determined in a manner described in the Examples section herein.

The sodium clearance of hollow fibers of the present invention can be, for example, from about 200 to about 300, or from about 250 to about 275, or from about 260 to about 280, or from about 265 to about 275, or other values. Sodium clearance can be determined in a manner described in the Examples section herein.

Furthermore the hollow fibers of the present invention can have a water absorption or moisture uptake capacity, for example, of from about 3% to about 10% by weight, or from about 5% to about 9% by weight, or from about 6% to about 8% by weight, or other values. The water absorption capacity can be ascertained in the following manner. Water-vapor saturated air is passed at room temperature (25° C.) through a dialyzer fitted with the hollow fibers and in a dry condition. In this respect, air is introduced under pressure into a water bath and after saturation with water vapor is run into the dialyzer. As soon as a steady state has been reached, it is then possible for the water absorption capacity to be measured.

Furthermore, membranes of the present invention can have an excellent separation boundary. The sieving coefficients, for example, can be measured as 1.0 for vitamin $B_{12}$, about 0.99 for inulin, 0.5 and 0.6 for myoglobin, and under 0.005 for human albumin, or other values. It can seen from this that the hollow fibers produced with the present invention can approximate, at least in part, natural kidney function with respect to separating properties (e.g., sieving coefficient).

The present invention will be further clarified by the following examples, which are intended to be only exemplary of the present invention. Unless indicated otherwise, all amounts, percentages, ratios and the like used herein are by weight.

EXAMPLES

In the following examples, molecular weights, ultrafiltration coefficient, sodium clearance, and bubble point were determined in the following manners.

Molecular weights were determined by Gel Permeation Chromatography using methylene chloride as eluant and with polystyrene as calibration standards. Solution viscosities of the spin-mass were measured in a Haake viscometer VT550. SEM pictures were obtained on a Hitachi TM-1000 tabletop SEM. Mechanical properties of the hollow fibers were measured on a tensile tester from MTS Systems Corporation, USA.

Ultrafiltration Coefficient in mL/hr/mm Hg was calculated by measuring the filtrate collected through the top dialyzate port while the bottom port was closed off and when water was pumped through the lumen side from bottom-up at an average pressure 152.6 mm Hg. The average pressure was taken to be the average calculated from the inlet pressure (3.85 psig) and the outlet pressure (2.05 psig).

Sodium clearance was measured by supplying an aqueous solution containing 154 mmol/L of sodium chloride to the lumen side at a rate of 300 mL/min from top to bottom while supplying pure water to the outside of fibers at a rate of 500 mL/min from bottom to top with no recycle in both circuits. After equilibration, samples from both the inlet and outlet of the sodium containing circuit were collected and the sodium was measured by a flame photometer to provide sodium clearance.

Bubble point was tested by applying air pressure to the outside of the fibers while the lumen side was supplied with water at a constant flow rate. If a higher pressure was maintained on the air-side, and if the fiber or the potting is faulty, air can flow through lumen side of the fiber and could be seen emerging through the top end-cap of the dialyzer. If no air leak was observed for at least 3 minutes at a trans-membrane pressure of 15 to 23 psi, then the dialyzer qualifies as a pass for the bubble point test.

Example 1

A 2 L two-piece glass cylindrical reactor with a reaction head was fitted with an overhead high-torque agitator through a vacuum-tight bearing in the center neck. An impeller suitable for high viscosity solution was used. The right neck was attached to a stopper whereas the left neck was attached to a 6-inch fractionation column, Dean-Stark trap with a provision for vapor thermometer and then a water-cooled condenser. The front neck was attached to a thermocouple thermometer. The reactor was placed in a 3 Liter oil bath whose temperature was controlled by a temperature controller. A nitrogen inlet tube was prepared with a provision to heat the nitrogen through an electrical heater.

The stopper on the right neck was replaced with a long-stemmed funnel through which 251.60 gram of bisphenol-A, 316.48 gram of 4,4'-dichlorodiphenylsulfone (DCDPS) and 161.46 gram of potassium carbonate and 550 gram of DMAC were charged into the reactor. Bisphenol-A was obtained from Bayer Material Science, DCDPS was obtained from Vertellus Specialty Materials, UK, and potassium carbonate was obtained from Armand Products Company. After the charging was complete, the right neck was attached to the nitrogen inlet. The reactor was immersed in 3 L oil bath, which was set to heat to 152° C. At this point, the reactor-head was installed with a heating-mantle and the Dean-Stark trap arm was wrapped with heating tapes to minimize condensation back into the reactor.

The bubbling into the reaction mixture of high purity nitrogen that was heated through an electrical heater was started and it was continued until end of the reaction. While the reaction temperature was maintained at 152° C., the byproduct of the reaction, water, distilled over to the Dean-Stark trap along with some DMAC. The nitrogen flow was regulated to provide about 5 to 20 milliliters of distillate an hour and to keep the vapor temperature above 100° C. The distillate in the trap was removed from the system and was analyzed for water by Karl-Fisher titration. To maintain the same concentration throughout the polymerization, when the distillate was removed from the trap on every hour, fresh DMAC was added to the reactor to the same extent the distillate was removed. Overall, during the course of the polymerization, about 200 to 300 gram of distillate was removed and this contained about 88% to 92% of the expected water. The same amount of fresh DMAC was also added to the reactor during the course of the reaction. The torque on the overhead agitator or Gel Permeation Chromatography on the reactor solution showed the growth of molecular weights during the reaction. Depending on the type of impeller employed in the polymerization, the desired molecular weights were reached in 20 hours or higher. When the desired molecular weight was reached, the oil bath was lowered and 250 gram of ice-cold DMAC was added to reduce the reaction temperature. This was followed by the addition of 5.0 gram of glacial acetic acid dissolved in 20 gram of DMAC to terminate the polymerization. While still hot, the reactor contents were then poured into a 4 Liter Erlenmeyer flask. The remaining polymer in the reactor was recovered by thoroughly washing the reactor with 1131 gram of DMAC and the washings were added to the Erlenmeyer. The contents in the Erlenmeyer were homogenized through overhead agitation. The potassium chloride, the byproduct of the reaction, was filtered off through a 2.0 micron sintered metal filter disk under nitrogen pressure to provide a clear polymer solution of about 20.0% solids. The final GPC analysis showed the Mn as 22,757, Mw at 76,232 and cyclic dimer at 1.01%. A commercially available Polysulfone suitable for membrane applications tested for an Mn at 22,228, Mw at 78,121 and cyclic dimer at 1.08%.

Example 2

A 1 L two-piece glass reactor was set-up as in Example 1 but without the fractionation column. Through the right neck and with the use of a long-stemmed funnel, 160.12 gram of bisphenol-A, 201.41 gram of 4,4'-dichlorodiphenylsulfone and 102.76 gram of potassium carbonate and 350 gram of NMP were charged into the reactor. After the charging was complete, the right neck was attached to the nitrogen inlet. The reactor was immersed in 3 L oil bath, which was set to heat to 190° C. At this point, the reactor-head was installed with a heating-mantle and the Dean-Stark trap arm with heating tapes to minimize condensation back into the reactor.

The bubbling into the reaction mixture of high purity nitrogen that was heated through an electrical heater was started and it was continued until end of the reaction. While the reaction temperature was maintained at 190° C., the byproduct of the reaction, water, distilled over to the Dean-Stark trap along with some NMP. The nitrogen flow was regulated to provide about 5 to 10 milliliters of distillate an hour and to keep the vapor temperature above 100° C. The distillate in the trap was removed from the system and was analyzed for water by Karl-Fisher titration. To maintain the same concentration throughout the polymerization, when the distillate was removed from the trap on every hour, fresh NMP was added to the reactor to the same extent the distillate was removed. Overall, during the course of the polymerization, about 50 gram of distillate were removed and this contained about 88% to 92% of the expected water. The same amount of fresh NMP was also added to the reactor during the course of the reaction. The torque on the overhead agitator or Gel Permeation Chromatography on the reactor solution showed the growth of molecular weights during the reaction. Depending on the type of impeller employed in the polymerization, the desired molecular weights were reached in 4.5 hours or higher. When the desired molecular weight was reached, the oil bath was lowered and 200 gram of ice-cold NMP was added to reduce the reaction temperature. This was followed by the addition of 5.0 gram of glacial acetic acid dissolved in 20 gram of DMAC to terminate the polymerization. While still hot, the reactor contents were then poured into a 4 Liter Erlenmeyer flask. The remaining polymer in the reactor was recovered by thoroughly washing the reactor with 667 gram of NMP and the washings were added to the Erlenmeyer. The contents were homogenized through overhead agitation. The potassium chloride, the byproduct of the reaction was filtered off through a 2.0 micron sintered metal filter disk under nitrogen pressure to provide a clear polymer solution of about 20.0% solids. The final GPC analysis showed the Mn at 22,593, Mw at 76,836 and cyclic dimer at 1.01%. A commercially available Polysulfone suitable for membrane applications tested for an Mn at 22,815; Mw at 79,759 and cyclic dimer at 1.02%.

Example 3

A 1 L two-piece glass reactor was set-up as in Example 1 but without the fractionation column. Through the right neck and with the use of a long-stemmed funnel. 167.22 gram of bisphenol-S, 194.75 gram of 4,4'-dichlorodiphenylsulfone and 94.66 gram of potassium carbonate and 350 gram of NMP were charged into the reactor. After the charging was complete, the right neck was attached to the nitrogen inlet. The reactor was immersed in 3 L oil bath, which was set to heat to 190° C. At this point, the reactor-head was installed with a heating-mantle and the Dean-Stark trap arm with heating tapes to minimize condensation back into the reactor.

The bubbling into the reaction mixture of high purity nitrogen that was heated through an electrical heater was started and it was continued until the end of the reaction. While the reaction temperature was maintained at 190° C., the byproduct of the reaction, water, distilled over to the Dean-Stark trap along with some NMP. The nitrogen flow was regulated to provide about 5 to 10 milliliters of distillate an hour and to keep the vapor temperature above 100° C. The distillate in the trap was removed from the system and was analyzed for water by Karl-Fisher titration. To maintain the same concentration throughout the polymerization, when the distillate was removed from the trap on every hour, fresh NMP was added to the reactor to the same extent the distillate was removed. Overall, during the course of the polymerization, about 90 gram of distillate were removed and this contained about 88% to 92% of the expected water. The same amount of fresh NMP was also added to the reactor during the course of the reaction. The torque on the overhead agitator or Gel Permeation Chromatography on the reactor solution showed the growth of molecular weights during the reaction. Depending on the type of impeller employed in the polymerization, the desired molecular weights were reached in 9.5 hours or higher. When the desired molecular weight was reached, the oil bath was lowered and 200 gram of ice-cold NMP was added to reduce the reaction temperature. This was followed by the addition of 5.0 gram of glacial acetic acid dissolved in 20 gram of DMAC to terminate the polymerization. While still hot, the reactor contents were then poured into a 4 Liter Erlenmeyer flask. The remaining polymer in the reactor was recovered by thoroughly washing the reactor with 692 gram of NMP and the washings were added to the Erlenmeyer. The contents were homogenized through overhead agitation. The potassium chloride, the byproduct of the reaction was filtered off through a 2.0 micron sintered metal filter disk under nitrogen pressure to provide a clear polymer solution of around 20.0% solids. The final GPC analysis of the Polyethersulfone polymer made by this example showed the Mn at 20,964 and Mw at 50,989. A commercially available Polyethersulfone suitable for membrane applications tested for an Mn at 20,652 and Mw at 52,034.

Example 4

A 2 L reactor was set-up as in Example 1 but without the fractionation column. Through the right neck and with the use of a long-stemmed funnel, 206.18 gram of 4,4'-biphenol, 317.96 gram of 4,4'-dichlorodiphenylsulfone and 162.22 gram of potassium carbonate and 500 gram of NMP were charged into the reactor. After the charging was complete, the right neck was attached to the nitrogen inlet. The reactor was immersed in 3 L oil bath, which was set to heat to 190° C. At this point, the reactor-head was installed with a heating-mantle and the Dean-Stark trap arm with heating tapes to minimize condensation back into the reactor.

The bubbling into the reaction mixture of high purity nitrogen that was heated through an electrical heater was started and it was continued until end of the reaction. While the reaction temperature was maintained at 190° C., the byproduct of the reaction, water, distilled over to the Dean-Stark trap along with some NMP. The nitrogen flow was regulated to provide about 10 to 30 milliliters of distillate an hour and to keep the vapor temperature above 100° C. The distillate in the trap was removed from the system and was analyzed for water by Karl-Fisher titration. To maintain the same concentration throughout the polymerization, when the distillate was removed from the trap on every hour, fresh NMP was added to the reactor to the same extent the distillate was removed. Overall, during the course of the polymerization, about 60 to 90 gram of distillate was removed and this contained about 88% to 92% of the expected water. The same amount of fresh NMP was also added to the reactor during the course of the reaction. The torque on the overhead agitator or Gel Permeation Chromatography on the reactor solution showed the growth of molecular weights during the reaction. Depending on the type of impeller employed in the polymerization, the desired molecular weights were reached in 3.0 hours or higher. When the desired molecular weight was reached, the oil bath was lowered and 400 gram of ice-cold NMP was added to reduce the reaction temperature. This was followed by the addition of 5.0 gram of glacial acetic acid dissolved in 20 gram of DMAC to terminate the polymerization. While still hot, the reactor contents were then poured into a 4 Liter Erlenmeyer flask. The remaining polymer in the reactor was recovered by thoroughly washing the reactor with 854 gram of NMP and the washings were added to the Erlenmeyer. The contents were homogenized through overhead agitation. The potassium chloride, the byproduct of the reaction was filtered off through a 2.0 micron sintered metal filter disk under nitrogen pressure to provide a clear polymer solution of around 20.0% solids. The final GPC analysis of the Polyphenylsulfone polymer made by this example showed the Mn at 23,856 and Mw at 54,558. A commercially available Polyphenylsulfone suitable for membrane applications showed the Mn at 22,581 and Mw at 53,290.

Example 5

Figure 1:
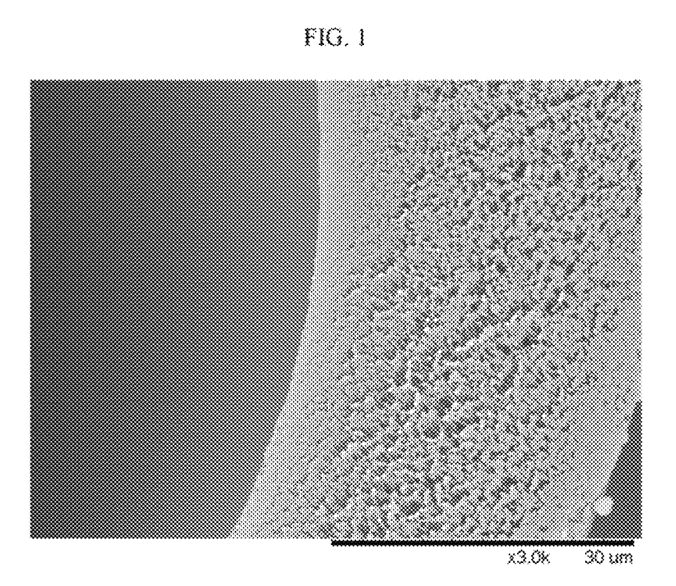
FIG. 1 is a scanning electron microscope (SEM) image taken at 3,000× magnification which shows a cross-sectional portion of a fiber from a commercial PSF/PVP/DMAC in accordance with a comparative example.
Figure 2:
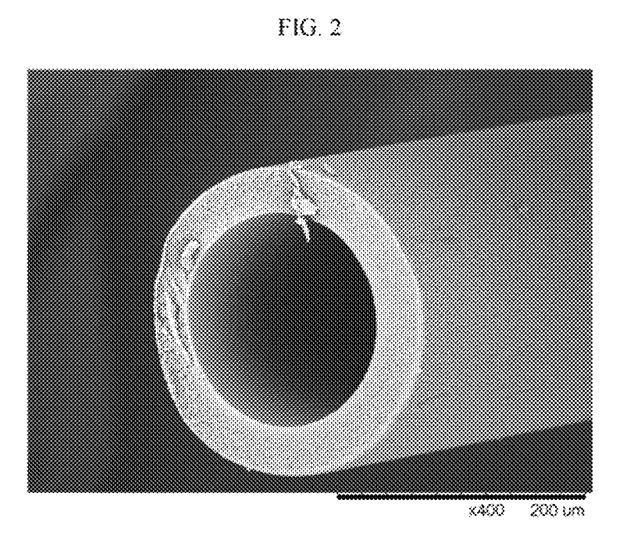
FIG. 2 is an SEM image taken at 400× magnification which shows a cross-sectional portion of a fiber from PSF/PVP/DMAC in accordance with at least one example of the present application.

Reactor solutions from Example 1 at about 20.0% PSF concentration were filtered through 2.0 micron sintered metal filter with a nitrogen pressure of 15 to 20 psi. About 3675 gram of the clear filtered Polysulfone (PSF) solution in DMAC with a solids content of 19.6% was mixed with a solution of 189.3 g of PVP K-90 containing 1.8% moisture in 711.5 g of DMAC. Overhead agitation for about 15 minutes provided a homogeneous solution of 1900 centipoise viscosity at 40° C. This spinning solution was supplied to the annular gap of a tube-in-tube extrusion spinnerette while the precipitating solution was supplied to the inside tube. The temperatures of the spinning solution and the spinnerette were kept at 40° C. The precipitating solution was a mixture of water and DMAC. The fibers coming out the spinnerette were immersed in water, washed thoroughly with water to remove residual DMAC and then dried. The hollow fibers thus produced has a thin barrier layer on the inside surface which sits on top of an open-pore spongy support layer. About 10,500 fibers of 278 mm length were bundled and inserted into a polycarbonate housing. The ends were potted with polyurethane to provide dialyzers. The hollow fibers and the dialyzers were tested for a number of properties and the results were compared to the fibers and dialyzers made from commercially available polysulfone pellets (Comparative Example 1). This comparison is shown in Table I. The results clearly demonstrate identical fibers and dialyzers can be made from the direct use of the polymer reactor solution in the spinning operation without a need to isolate the polymer as pellet or as powder. FIGS. 1 and 2 show SEM pictures of the fibers made from Comparative Example 1 and from Example 5. These pictures show both fibers to be of identical nature.

Example 6

Figure 3:
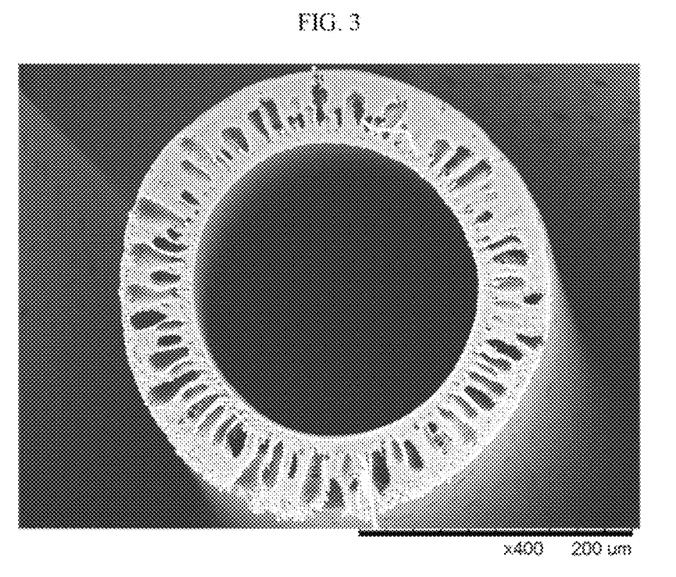
FIG. 3 is an SEM image taken at 400× magnification which shows a cross-sectional portion of a fiber from PSF/PVP/NMP in accordance with at least one example of the present application.

Reactor solutions from Example 2 at about 20.0% Polysulfone concentration were filtered through 2.0 micron sintered metal filter with a nitrogen pressure of 15 to 20 psi. About 2211 gram of the clear filtered Polysulfone solution in NMP with a solids content of 20.0% was mixed with a solution 106 gram of K-90 and 550 g of NMP to provide a spinning solution. This solution exhibited a solution viscosity of 3190 cp at 40° C. and 1790 cp at 60° C. This solution was converted into hollow fibers and dialyzers as in Example 4 with a precipitating solution of water and NMP. The results are shown in Table 1. FIG. 3 shows an SEM picture of the fiber made from this example.

Example 7

Figure 4:
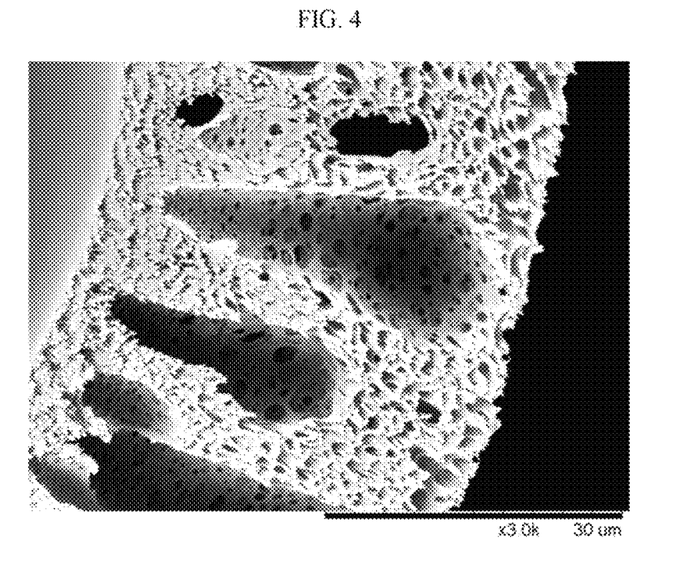
FIG. 4 is an SEM image taken at 3,000× magnification which shows a cross-sectional portion of a fiber from PES/PVP/NMP in accordance with at least one example of the present application.

Reactor solutions from Example 3 at about 20.0% Polyethersulfone concentration were filtered through 2.0 micron sintered metal filter with a nitrogen pressure of 15 to 20 psi. About 3635 g of the clear filtered Polyethersulfone (PES) solution in NMP from Example #3 with a solids content of 19.82% was mixed with a solution of 90.0 g of PVP K-90, 225.0 g of PVP K-30, 90.0 g of DI water and 461 g of NMP to provide a spinning solution. This solution exhibited a solution viscosity of 3820 cp at 35° C. This solution was converted into hollow fibers and dialyzers as described in Example 4 with a precipitating solution of water and NMP. The results are shown in Table 1. FIG. 4 shows an SEM picture of the fiber made from this example.

Example 8

Figure 5:
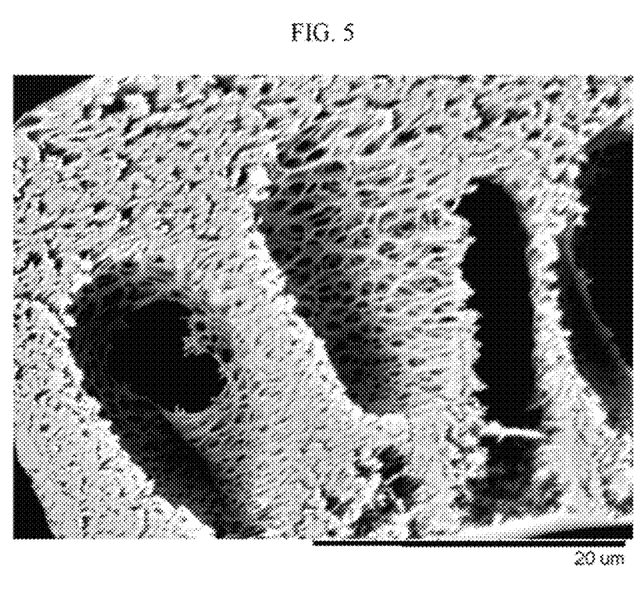
FIG. 5 is an SEM image which shows a cross-sectional portion of a fiber from PPSF/PVP/NMP in accordance with at least one example of the present application.

Reactor solutions from Example 4 at about 20.0% polyphenylsulfone (PPSF) concentration were filtered through 2.0 micron sintered metal filter with a nitrogen pressure of 15 to 20 psi. About 3657 g of the filtered polyphenylsulfone solution in NMP from Example #4 with a solids content of 20.13% was mixed with a solution of 142.55 g of PVP K-90 and 844.94 g of NMP to a provide a spinning solution. This spinning solution showed a viscosity of 4200 cp at 40° C. This solution was converted into hollow fibers and dialyzers as described in Example 4 with a precipitating solution of water and NMP. The results are shown in Table 1. FIG. 5 shows an SEM picture of the fiber made from this example.

TABLE 1

Comparative Data on the Fibers and Dialyzers made from the direct use of Polysulfone, Polyethersulfone and Polyphenylsulfone Reactor Solutions

| | Characteristic | Process | | | | |
| --- | --- | --- | --- | --- | --- | --- |
| | | Comp. Ex. 1 | Example 5 | Example 6 | Example 7 | Example 8 |
| Fiber | ID, μm | 185 | 186 | 214 | 160 | 176 |
| | Wall Thickness, μm | 35 | 35 | 40 | 43 | 41 |
| | Break Load, gf | 24.2 | 24.4 | 22.5 | 20.2 | 19.7 |
| | Modulus, MPa | 120 | 135 | 126 | 161 | 129 |
| | Elongation @ Break % | 73 | 70 | 47 | 24 | 21 |
| Dialyzer | KUF | 266 | 195 | 333 | 308 | 408 |
| | Sodium-Clearance | 272 | 272 | 236 | 234 | 241 |
| | Bubble Point | Pass | Pass | Pass | Pass | Pass |

Example 9

A 1 liter two-piece cylindrical reactor flask was fitted with an overhead high-torque agitator through a vacuum-tight bearing. The right neck was attached to a nitrogen inlet tube whereas the left neck was attached to 6-inch fractionating column, a Dean-Stark trap which was then fitted with a water-cooler condenser. The front neck was attached to a thermocouple thermometer. The reactor was placed in a 3 liter oil bath whose temperature was controlled by a temperature controller. The reactor was charged with 136.21 gram of biphenol-A, 171.33 gram of 4,4'-dichlorodiphenylsulfone (DCDPS) and 87.41 gram of potassium carbonate and 350 gram of DMAC. Bisphenol-A was obtained from Bayer Material Science, DCDPS was obtained from Vertellus Specialty Materials, UK, and potassium carbonate was obtained from Armand Products Company. The nitrogen inlet was replaced with a stopper. With slow agitation, the reactor solution was degassed by vacuum and refilled with nitrogen three times after which the stopper was removed and replaced with the nitrogen inlet tube. The oil bath was now set to heat to 152° C. At this point, the reactor-head was installed with a heating-mantle and the Dean-Stark trap with insulation tapes to minimize condensation back into the reactor. The nitrogen flow was started and bubbled into the reactor solution for 24 hours. The distillate that collected in the trap comprising water and DMAC were removed from the system. To maintain the same concentration throughout the polymerization, fresh DMAC was added to the reactor to the same extent the distillate was removed from the system. Overall, during through the course of the polymerization, 98 grams of distillate were discarded and 98 grams of fresh DMAC were added to the reactor. In about 55 hours, the desired molecular weights were reached. At this point, 2.66 grams of glacial acetic acid dissolved in 266 grams of DMAC was added to stop the polymerization. The reactor contents were poured into a 4 liter Erlenmeyer flask containing 190 grams of DMAC followed by the reactor washings using 150 grams of DMAC. The contents were homogenized through overhead agitation. GPC analysis showed the reaction product of polysulfone polymer had a number average molecular weight (Mn) as 23,527, weight average molecular weight (Mw) as 80,549, and cyclic dimer content as 1.07%.

Example 10

A polysulfone in N-methylpyrrolidone (NMP) was prepared. A 1 liter two-piece cylindrical reactor flask was fitted with an overhead high-torque agitator through a vacuum-tight bearing. The right neck was attached to a nitrogen inlet tube whereas the left neck was attached to a Dean-Stark trap which was topped with a water-cooler condenser. The front neck was attached to a thermocouple thermometer. The reactor was placed in a 3 liter oil bath whose temperature was controlled by a temperature controller. The reactor was charged with 137.24 grams of bisphenol-A, 172.63 grams of 4,4'-dichlorodiphenylsulfone and 88.07 grams of potassium carbonate and 300 grams of NMP. The nitrogen inlet was replaced with a stopper. With slow agitation, the reactor solution was degassed and refilled with nitrogen three times after which the stopper was removed and replaced with the nitrogen inlet tube. The oil bath was now set to heat to 190° C. At this point, the reactor-head was installed with heating-mantle and insulation tapes for the Dean-Stark trap to minimize condensation back into the reactor. The nitrogen flow was started and bubbled into the reactor solution for 4 hours. The distillate that collected in the trap comprising water and NMP were removed from the system. To maintain the same concentration throughout the polymerization, fresh NMP was added to the reactor to the same extent that the distillate was removed from the system. Overall, during through the course of the polymerization, 20 grams of distillate were discarded and 20 grams of fresh NMP were added to the reactor. A Karl-Fisher titration showed that the distillate contained about 47% water. In about 7 hours, the desired molecular weights were reached. At this point, 192 grams of NMP were added to dilute the reaction mixture. Once homogenized through overhead agitation, 2.66 grams of glacial acetic acid dissolved in 25 grams of NMP was added slowly to stop the flask followed the reactor washings using 547 grams of NMP. The contents were homogenized through overhead agitation. GPC analysis showed the reaction product of polysulfone polymer had a number average molecular weight (Mn) as 23,496, weight average molecular weight (Mw) as 75,167, and cyclic dimer content as 0.92%.

Example 11

A hollow fiber was prepared using the reactor solution of Example 1. 513 grams of a solution comprising 20% by weight polyvinylpyrrolidone (PVP, MW: about 1 million Daltons) in DMAC was added to 2178 grams of the polysulfone reactor solution containing polysulfone (PSF) prepared as in Example 1. Overhead agitation for about 15 minutes provided a homogenous solution of 1900 centipoise viscosity at 40° C. The resulting polymer solution was used as a casting solution. This solution was pumped to an annular extrusion spinneret consisting of concentric tubes. The outer diameter orifice was about 0.4 mm while the inner diameter is about 0.2 mm. The casting solution was supplied to the spinneret simultaneously with a precipitating solution. The precipitating solution was a mix of water and 30-70% DMAC solvent. The ratio of precipitating solution to casting solution (polymer solution) flow rates (by volume) to the spinneret was about 1:1 to about 1:2. The extruded hollow fibers were cast into an aqueous bath (64° C.), which was separated from the bottom of the spinneret by a distance of about 60 cm. The extruded hollow membrane fibers were washed with water and dried at about 110° C.-130° C., collected, and cut to about 278 mm. The hollow fiber produced had a thin barrier layer on the radial inside surface integrally adjacent an open-pore radially outer support layer.

For comparison, a polysulfone fiber was prepared with a polymer which is separated from the reaction solvent and dried before wet spinning processing. A second batch of the reactor solution was prepared in a similar manner as in Example 1. The product polymer was separated from solvent in the reactor solution solvent by precipitation in water, followed by filtration and drying to provide a dried polymer product. About 2178 grams of the polysulfone solvent in DMAC made from dry polymer was added to about 513 grams of a 20% solution of polyvinylpyrrolidone (PVP) in DMAC. The resulting polymer solution then was agitated and pumped simultaneously with a precipitating solution to a spinneret to form hollow fibers similar to the above indicated procedure.

The internal diameter (ID), wall thickness, water permeability (KUF), and sodium clearance for the hollow fibers obtained from both starting materials, and also the strain at break and elongation at break for the fibers obtained from the non-dried reactor solution, are shown in Table 2. The sodium clearance data were ascertained in the lab with aqueous solutions for fibers having 1.40 square meters of active surface area at a blood flow rate of 300 mL/min.

TABLE 2

| | Sample | |
|---|---|---|
| | A (with Comparison Polysulfone) | 1 (with Reactor Solution Polysulfone) |
| Source of PSF Polymer for Wet Spinning | Solvent-separated, Dried PSF Redissolved in DMAC | PSF in DMAC of Reactor Solution of Ex. 1 |
| Spinning Condition | Spin-Mass in DMAC | Spin-Mass in DMAC |
| ID (micron) | 185 | 186.1 |
| Wall Thickness (micron) | 35 | 34.9 |
| Stain at Break (%) | 83.6 ± 3 | 69.80% |
| Elongation at Break (%) | 31.8 ± 1.2 | 26.50% |
| KUF (ml/hr · mm Hg · m$^2$) | 198 | 199 |
| Na Clearance (mL/min) | 273 | 267 |
| Break load (g force) | 20.9 ± 0.75 | |

As shown in Table 2, the hollow fiber formed with the reactor solution of Example 9 was comparable in the indicated structural and performance properties to the hollow fiber made with polysulfone prepared by standard methods in which dried polymer product is redissolved in solvent for wet spinning.

Example 12

Polymer Plant Reaction with 1:1 Molar Ratio & Single-Pass Filtration

A 650 gallon stainless steel jacketed reactor was commissioned for production of polysulfone solution in DMAC. A powder inlet valve was installed above the reactor through which 480.54 kilogram of bisphenol-A, 604.48 kilogram of 4,4'-dichlorodiphenylsulfone (DCDPS), 320.02 kilogram of potassium carbonate and 1554 kilogram of DMAC were charged into the reactor. The molar ratio of Bisphenol-A to 4,4'-dichlorodiphenylsulfone was 1:1 for this example. Bisphenol-A was obtained from Bayer Material Science, DCDPS was obtained from Vertellus Specialty Materials, UK, and potassium carbonate was obtained from Armand Products Company. After the charging was complete, the reactor was purged with nitrogen three times and then heated nitrogen flow was fed to the bottom of the reactor through three sparging inlets ranging from 1 standard cubic foot per minute up to 5.2 standard cubic feet per minute. A nitrogen feed was maintained throughout the reaction sequence. The reactor jacket was heated to 185° C. to achieve a reactor temperature between 150° C. and 163° C. The reactor system includes an overhead agitator, which was used to mix the reactor contents throughout the reaction sequence. Torque feedback from the reactor agitator was used throughout the reaction sequence to monitor polymer growth. Polymer growth was also monitored by Gel Permeation Chromatography. The reactor system includes a shell and tube heat exchanger using a water based tempering agent to maintain temperature between 110° C. and 120° C. This partial condenser was directly attached to the top of the reactor and vented to a collection tank for distillate. Distillate consisting of water in DMAC was collected by the partial condenser system. The mass of distillate was monitored and fresh DMAC added to the reactor vessel each hour in proportion to the amount of DMAC solvent and water removed from the reactor system. Overall throughout the reaction sequence, 1209 kg of distillate was collected and this contained 100% of the expected water. When the polymer solution reached the target molecular weight of 72,000 Daltons, the reactor was quenched with 123 kg of cold DMAC solvent and the reactor oil jacket was cooled to 160° C. Reactor contents were transferred by positive displacement pump to a 1200 gallon stainless steel jacketed dilution tank. The reactor was rinsed with an additional 2552.03 kg of DMAC solvent and then the rinse DMAC with polymer solution was transferred from the reactor to the dilution tank. Once mixed, the resulting homogenous polymer solution in the dilution tank was approximately 19% polysulfone in 75% DMAC and 7% potassium chloride salt, which is a byproduct of the reaction, with percent being wt % based on total weight of polymer solution. The polymer solution was filtered in a single pass through a 2.0 micron sintered metal filter system including 128 tubular filter elements. Polymer flows into the center of the tubular media. Liquid polymer solution flows through the porous metal while potassium salts are retained by the media. The final GPC analysis showed the Mn at 23,385, Mw at 79,991 and cyclic dimer at 0.95%. Residual, unreacted bisphenol-A was measured at 18.4 ppm by GC and residual potassium in solution was measured at 760.9 ppm by ICP.

Example 13

Polymer Plant Reaction with 0.984:1 Molar Ratio & Multi-Pass Filtration

A 650 gallon stainless steel jacketed reactor was commissioned for production of polysulfone solution in DMAC. A powder inlet valve was installed above the reactor through which 474.11 kilogram of bisphenol-A, 605.13 kilogram of 4,4'-dichlorodiphenylsulfone (DCDPS), 319.69 kilogram of potassium carbonate and 1050.45 kilogram of DMAC were charged into the reactor. The target molar ratio of Bisphenol-A to 4,4'-dichlorodiphenylsulfone was 0.984:1 for this example. Bisphenol-A was obtained from Bayer Material Science, DCDPS was obtained from Vertellus Specialty Materials, UK, and potassium carbonate was obtained from Armand Products Company. After the charging was complete, the reactor was purged with nitrogen three times and then heated nitrogen flow was fed to the bottom of the reactor through three sparging inlets ranging from 6.8 Kg/hr (1 standard cubic foot per minute) up to 30 kg/hr (5.2 standard cubic feet per minute). The nitrogen feed was maintained throughout the reaction sequence. The reactor jacket was heated to 185° C. to achieve a reactor temperature between 150° C. and 163° C. The reactor system includes an overhead agitator, which was used to mix the reactor contents throughout the reaction sequence. Torque feedback from the reactor agitator was used throughout the reaction sequence to monitor polymer growth. Polymer growth was also monitored by Gel Permeation Chromatography. The reactor system included a shell and tube heat exchanger using a water based tempering agent to maintain temperature between 110° C. and 120° C. This partial condenser was directly attached to the top of the reactor and vented to a collection tank for distillate. Distillate consisting of water in DMAC was collected by the partial condenser system. The mass of distillate was monitored and fresh DMAC added to the reactor vessel each hour in proportion to the amount of DMAC solvent and water removed from the reactor system. Overall throughout the reaction sequence, 1168 kg of distillate was collected and this contained 100% of the expected water. The reaction stalled at approximately 73,000 daltons. A second addition of 0.25 kg bisphenol-A dissolved in approximately 5 L DMAC was added to the reactor through a 2" inlet port on top of the vessel. The reaction continued until the second stall when molecular weight was measured at 77,527. The polymer solution was quenched with 523 kg of cold DMAC solvent and the reactor oil jacket was cooled to 160° C. Reactor contents were transferred by positive displacement pump to a 1200 gallon stainless steel jacketed dilution tank. The reactor was rinsed with an additional 1930.55 kg of DMAC solvent and then the rinse DMAC with polymer solution was transferred from the reactor to the dilution tank. Once mixed, the resulting homogenous polymer solution in the dilution tank was approximately 20% polysulfone in 73% DMAC and 7% potassium chloride salt, which is a byproduct of the reaction, with all percents being wt % based on total weight of the polymer solution. The polymer solution was filtered using multiple passes through a 2.0 micron sintered metal filter system including 128 tubular filter elements. Polymer flows into the center of the tubular media. Liquid polymer solution flows through the porous metal while potassium salts are retained by the media. The final GPC analysis showed the Mn at 22,668, Mw at 78,318 and cyclic dimer at 0.97%. Residual, unreacted bisphenol-A was measured at 3.73 ppm by GC and residual potassium in solution was measured at 349.1 ppm by ICP.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A process for preparation of at least one polyarylether comprising reacting polyarylether forming reactants in a reactor solution, said reaction solution comprising at least one polar aprotic solvent and the polyarylether forming reactants with removing of water in the absence of azeotrope forming cosolvent and adding fresh polar aprotic solvent to the reactor solution in substantially equal amount to any polar aprotic solvent removed from the reactor solution during the reacting, wherein the polar aprotic solvent is dimethylacetamide, N-methylpyrrolidone, dimethylsulfoxide, diphenylsulfone, or any combinations thereof.

2. The process of claim 1, wherein the adding of fresh polar aprotic solvent occurs during the reacting to replace a polar aprotic solvent removed so as to maintain solvent concentration of the solvent in the reactor solution to within ±10% of a starting concentration thereof throughout the reacting.

3. The process of claim 1, wherein the polar aprotic solvent is dimethylacetamide.

4. The process of claim 1, wherein the polar aprotic solvent is N-methylpyrrolidone.

5. The process of claim 1, wherein the at least one polyarylether is polysulfone.

6. The process of claim 1, wherein the at least one polyarylether is polyethersulfone.

7. The process of claim 1, wherein the at least one polyarylether is polyphenylsulfone.

8. The process of claim 1, wherein the polyarylether forming reactants comprise a dihydroxyaromatic compound, a dihaloaromatic compound, a weak base, and a polar aprotic solvent.

9. The process of claim 1, wherein the polyarylether forming reactants comprise (i) substantially equimolar amounts of bisphenol and dihalobenzenoid, and (ii) alkali metal carbonate.

10. The process of claim 1, wherein the reacting is conducted for about 5 hours to about 70 hours.

11. The process of claim 1, wherein the reacting is conducted for about 15 to about 30 hours.

12. The process of claim 1, wherein polyarylether produced by the reacting has a weight average molecular weight of from about 40,000 to about 120,000.

13. The process of claim 1, wherein polyarylether produced by the reacting has a weight average molecular weight of from about 60,000 to about 85,000.

14. The process of claim 1, further comprising making a membrane with the polyarylether product.

15. The process of claim 1, further comprising making a flat sheet or hollow fiber with polyarylether product of the reacting.

16. The process of claim 1, further comprising directly spinning the reactor solution after the reacting through a spinneret to form hollow fibers without previously isolating polyarylether product of the reacting from the polar aprotic solvent.

17. The process of claim 1, further comprising directly spinning the reactor solution after the reacting through a spinneret to form hollow fibers without previously isolating polyarylether product of the reacting from the polar aprotic solvent, wherein the polyarylether product is polysulfone, polyethersulfone, polyphenylsulfone, or any combinations thereof.

18. The process of claim 1, further comprising directly making a coating with the reactor solution after the reacting without previously isolating polyarylether product of the reacting from the polar aprotic solvent.

19. A process for preparation of at least one polyarylether comprising reacting polyarylether forming reactants in a reactor solution, said reaction solution comprising at least one polar aprotic solvent and the polyarylether forming reactants with removing of water in the absence of azeotrope forming cosolvent and adding fresh polar aprotic solvent to the reactor solution in substantially equal amount to any polar aprotic solvent removed from the reactor solution during the reacting, wherein the polar aprotic solvent is dimethylacetamide, N-methylpyrrolidone, dimethylsulfoxide, diphenylsulfone, or any combinations thereof, said process is conducted with a stoichiometric excess of one of the two polyarylether forming reactants such that the final product contains substantially less of the stoichiometrically deficient reactant and the reaction is self-terminating.

* * * * *